United States Patent
Ogiso et al.

(10) Patent No.: US 7,032,567 B2
(45) Date of Patent: Apr. 25, 2006

(54) CONTROL APPARATUS AND METHOD FOR INTERNAL COMBUSTION ENGINE HAVING VARIABLE VALVE SYSTEM

(75) Inventors: Makoto Ogiso, Mishima (JP); Tomomi Yamada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 240 days.

(21) Appl. No.: 10/628,497

(22) Filed: Jul. 29, 2003

(65) Prior Publication Data
US 2004/0031466 A1 Feb. 19, 2004

(30) Foreign Application Priority Data
Aug. 9, 2002 (JP) ............................. 2002-232227

(51) Int. Cl.
*F01L 1/34* (2006.01)

(52) U.S. Cl. ...................................... 123/348; 123/9.15

(58) Field of Classification Search ............. 123/90.15, 123/348, 347, 399
See application file for complete search history.

(56) References Cited

U.S. PATENT DOCUMENTS

| | | | |
|---|---|---|---|
| 6,170,475 B1 * | 1/2001 | Lewis et al. | 123/568.21 |
| 6,182,636 B1 * | 2/2001 | Russell et al. | 123/399 |
| 6,405,694 B1 | 6/2002 | Sato | |
| 6,513,493 B1 * | 2/2003 | Robichaux et al. | 123/399 |
| 6,634,328 B1 * | 10/2003 | Russell et al. | 123/90.15 |

FOREIGN PATENT DOCUMENTS

| | | |
|---|---|---|
| EP | 1 063 393 A2 | 12/2000 |
| JP | A 9-170462 | 6/1997 |
| JP | A 2001-159355 | 6/2001 |
| JP | A 2001-221094 | 8/2001 |
| JP | A 2001-234769 | 8/2001 |
| JP | A 2001-355462 | 12/2001 |
| JP | A 2002-130012 | 5/2002 |

* cited by examiner

*Primary Examiner*—Mahmoud Gimie
(74) *Attorney, Agent, or Firm*—Oliff & Berridge PLC

(57) ABSTRACT

An internal combustion engine is provided with a variable mechanism capable of adjusting the amount of intake air introduced into each cylinder by controlling the operation angle of intake valves. In a low-load region, the intake valve operation angle is minimized, and the amount of intake air is controlled on the basis of the degree of throttle opening. In the low-load region, the operation angle of each valve is set so that there is no period during which both an intake valve and an exhaust valve are open. In a high-load region where the intake pipe pressure becomes equal to the atmospheric pressure, the amount of intake air is controlled on the basis of the operation angle. During this process, the degree of throttle opening is controlled so that the intake pipe pressure can be kept at the atmospheric pressure before and after the intake amount control based on the operation angle is performed. Therefore, fluctuations in the intake pipe pressure at the time of a change of the operation angle can be reduced or prevented, and the amount of intake air can be controlled with good precision. Thus, the torque shock can be reduced or prevented.

13 Claims, 7 Drawing Sheets

CONTROL APPARATUS AND METHOD FOR INTERNAL COMBUSTION ENGINE HAVING VARIABLE VALVE SYSTEM

INCORPORATION BY REFERENCE

The disclosure of Japanese Patent Application No. 2002-232227 filed on Aug. 9, 2002, including the specification, drawings and abstract is incorporated herein by reference in its entirety.

BACKGROUND OF THE INVENTION

1. Field of Invention

The invention relates to an operation control of an internal combustion engine in which the amount of intake air can be adjusted in at least two fashions based on the period during which an intake valve is open, and the degree of throttle opening.

2. Description of Related Art

In some internal combustion engines, electromagnetic valves are adopted as intake valves and exhaust valves so that the period of time during which these valves are open (hereinafter, referred to as "operation angle" that represents the open valve period of time in terms of the angle of a crankshaft), the amount of lift of the valves, and the phase thereof can be changed. In such engines, the amount of intake air can be controlled on the basis of two factors, that is, the intake valve operation angle and the degree of throttle opening.

Examples of the technology for controlling the amount of intake air based selectively on the operation angle and the degree of throttle opening are as follows. Japanese Patent Application Laid-open No. 2001-159355 discloses a technology in which the degree of throttle opening is used to control the amount of intake air in a low-load region whereas in a high-load region both the operation angle and the degree of throttle opening are used. Japanese Patent Application Laid-open No. 2001-221094 discloses a technology in which during idle engine operation, an intake amount control based on the operation angle and an intake amount control based on the degree of throttle opening are selectively performed, and during the switching period of transition between the two controls, a torque shock is reduced by a feedforward control.

However, according to the related-art technologies, a torque shock often occurs at the time of switch between the operation angle-based intake amount control and the throttle-based intake amount control or during execution of the operation angle-based intake amount control during a normal engine operation. Thus, the packaging of the intake amount control based on the valve operation angle still has room for improvement.

SUMMARY OF THE INVENTION

Accordingly, a purpose of the invention is to substantially prevent occurrence of a torque shock associated with application of the intake amount control based on the valve operation angle in an internal combustion engine.

The control object in the invention is an internal combustion engine having a variable valve mechanism capable of changing a valve opening characteristic regarding an intake valve, and a throttle valve capable of changing a negative pressure in an intake pipe. In order to control such an internal combustion engine, a control apparatus according to a first aspect of the invention includes a controller which controls the valve opening characteristic and a degree of opening of the throttle valve, and which controls an amount of intake air taken into the internal combustion engine through at least one of the control of the valve opening characteristic and the control of the degree of opening of the throttle valve in accordance with an output that is requested of the internal combustion engine. The controller is further adapted to, during a first operation state where the amount of intake air is controlled through the control of the valve opening characteristic control, control the degree of opening of the throttle valve within a range of the degree of opening of the throttle valve that allows maintenance of an atmospheric pressure in the intake pipe under a condition that the valve opening characteristic is in a steady state at least during the first operation state, while maintaining a continuity of the degree of opening of the throttle valve during a period of switch between the first operation state and a second operation state where the amount of intake air is controlled through the control of the degree of opening of the throttle valve only. According to the control apparatus thus constructed, the degree of opening of the throttle valve during a first operation state where the amount of intake air is controlled on the basis of the valve opening characteristic is controlled under the following two conditions. One of the conditions is that the degree of opening of the throttle valve be within such a range that an atmospheric pressure can be maintained in the intake pipe under a condition that the valve opening characteristic is in a steady state at least during the first operation state. The other condition is that a continuity of the degree of opening of the throttle valve be maintained during a period of switching between the first operation state and a second operation state where the amount of intake air is controlled by using the throttle control portion without using the valve control portion.

One of the factors responsible for a torque shock at the time of switching between the intake amount control based on the valve opening characteristic and the intake amount control based only on the degree of throttle opening is fluctuation of the negative pressure in the intake pipe resulting in an amount of intake air that is greater or less than a target value. The intake pipe negative pressure fluctuates due to a change in the valve opening characteristic or low responsiveness of the throttle opening degree-based intake amount control. For example, a case will be considered in which the engine output is increased by changing the valve opening characteristic so as to increase the amount of intake air during the second operation state where the amount of intake air is controlled on the basis of only the degree of throttle opening. In general, the throttle opening degree control is inferior to the valve opening characteristic control in terms of responsiveness of the amount of intake air. For example, if an increase in the amount of intake air into each cylinder is attempted by changing the valve opening characteristic while changing the degree of throttle opening within a range that allows maintenance of the atmospheric pressure provided that the engine operation is steady, the change in the degree of throttle opening may not be sufficiently followed by a change in the intake pipe pressure, resulting in a relatively low intake pipe pressure and therefore an amount of intake air that is short of the target value. Conversely, in some cases, the amount of intake air may exceed the target value due to a response delay of the throttle opening degree-based intake amount control, at the time of transition from the first operation state where the intake valve-based intake amount control is performed to the second operation state. Such an excessive or short amount of intake air causes a torque shock.

According to the above-described control, the degree of throttle opening is controlled so that a continuity of the degree of throttle opening is maintained at the time of switching between the intake amount control based on the valve opening characteristic and the intake amount control based on the degree of throttle opening. Therefore, the response delay of the throttle opening degree-based intake amount control can be reduced. Furthermore, since the switch between the controls is performed while the intake pipe pressure is kept at the atmospheric pressure, the excess or shortfall of the amount of intake air caused by the delay in the following of the intake pipe pressure can be reduced, and therefore the torque shock can be reduced or prevented.

It is to be noted herein that the valve opening characteristic can be specified by parameters that represent an open state of the intake valve and that affect the amount of intake air, for example, the period during which the intake valve is open, the amount of opening of the intake valve, etc. The phrase of "continuity of the degree of throttle opening" does not necessarily mean a requirement that the degree of throttle opening change smoothly. However, a control for smoothly changing the degree of throttle opening will further reduce the torque shock, and is therefore preferable.

As an example of the aforementioned control, the throttle valve may be fully opened when the intake amount control based on the valve opening characteristic is performed. The degree of throttle opening needed for maintaining the atmospheric pressure in the intake pipe is not necessarily a full-open degree. Therefore, when the aforementioned control is applied, it is preferable to control the degree of throttle opening so that the degree of throttle opening will continuously change from a region where the amount of intake air is controlled via only the throttle valve within the range of degree of throttle opening that allows maintenance of the atmospheric pressure in the intake pipe. As a result of this preferable construction, the possibility of a torque shock in relation to a sharp change in the degree of throttle opening can be reduced.

It is preferable to keep the throttle valve at such a degree of opening that the atmospheric pressure exists in the intake pipe during a transitional period during which the valve opening characteristic is changing, as well as during a period during which the valve opening characteristic is in a steady state. As a result, the torque shock can be reduced during the transitional period as well. The degree of opening of the throttle valve that allows maintenance of the atmospheric pressure is greater during the transitional period than during the period of the steady state. The degree of opening of the throttle valve that allows maintenance of the atmospheric pressure during the transitional period can be set by, for example, empirically or analytically specifying a degree of throttle opening that allows maintenance of the atmospheric pressure in a condition where the valve opening characteristic is changed at a practically required maximum rate.

Next, a control apparatus according to a second aspect of the invention is a control apparatus for an internal combustion engine having a variable valve mechanism capable of changing a valve opening characteristic regarding an open state of an intake valve, and a throttle valve capable of changing a negative pressure in an intake pipe. The control apparatus includes a controller which is capable of controlling the valve opening characteristic and a degree of opening of the throttle valve, and which is adapted to control an amount of intake air taken into the internal combustion engine through at least one of the control of the valve opening characteristic and the control of the degree of opening of the throttle valve in accordance with an output that is requested of the internal combustion engine. The controller is further adapted to, if a switch between an intake amount control through the control of the degree of opening of the throttle valve and an intake amount control through the control of the valve opening characteristic is requested, cause the requested switch after an output of the internal combustion engine based on a currently performed intake amount control has reached a steady state. According to the control apparatus constructed as described above, if a switch between an intake amount control based on the degree of throttle opening and an intake amount control based on the valve opening characteristic is requested, the switch is performed after an output of the internal combustion engine based on a currently performed intake amount control has reached a substantially steady state. Therefore, the torque shock at the time of switching between the controls can be reduced. For example, a case where the throttle opening degree-based control is switched to the valve opening characteristic-based control will be considered. If the control switching is performed while the amount of intake air under the currently performed control, that is, the throttle opening degree-based control, has not settled in the steady state, there is a possibility of causing a transitional fluctuation in the amount of intake air and therefore a torque shock since the intake pipe pressure is unstable. In contrast, if the switching is performed after the amount of intake air under the throttle opening degree-based control has reached the steady state, the torque shock caused by the aforementioned unstable intake pipe pressure can be substantially prevented.

The above-described control is particularly useful in the case where the air-fuel ratio is controlled on the basis of the intake pipe pressure. The control is also useful in the case where the intake amount control based on the valve opening characteristic is applied for the purpose of improving combustion or the like during a relatively low-load engine operation, that is, during a state where the degree of throttle opening is relatively small.

In conjunction with the above-described control, the "switch" broadly means a change in the state of application of two control modes, that is, the intake amount control based on the degree of throttle opening, and the intake amount control based on the valve opening characteristic. Therefore, the "switch" includes a switch from the throttle opening degree-based control to the valve opening characteristic-based control, a switch from the valve opening characteristic-based control to the throttle opening degree-based control, a switch from a combined use of the throttle opening degree-based control and the valve opening characteristic-based control to only one of the controls, and a switch from only one of the controls to a combined use of the controls.

Next, a control apparatus according a third aspect of the invention is a control apparatus for an internal combustion engine having a variable valve mechanism capable of changing a valve opening characteristic regarding an open state of an intake valve and an open state of an exhaust valve. The control apparatus includes a controller which controls the valve opening characteristic, and which controls an amount of intake air taken into the internal combustion engine through the control of valve opening characteristic in accordance with an output that is requested of the internal combustion engine. The controller is adapted to control the valve opening characteristic so that an opening start timing of the intake valve and a closing timing of the exhaust valve become substantially symmetrical about a timing at which a combustion chamber capacity of the internal combustion engine becomes minimum at least during a predetermined operation state of the internal combustion engine. According to the control apparatus constructed as described above, the valve opening characteristic is controlled so that an opening start timing of the intake valve and a closing timing of the exhaust valve become substantially symmetrical about a timing at which a combustion chamber capacity of the internal combustion engine becomes minimum at least during a predetermined operation state. The "timing at which a combustion chamber capacity of the internal combustion engine becomes minimum" means, for example, the timing of the top dead center in a piston-type engine. The "symmetrical" means, for example, that if the opening start timing of the intake valve is a certain amount earlier than the top dead center, the closing timing of the exhaust valve is an equal amount later than the top dead center. Similarly, the "symmetrical" also means that if the opening start timing of the intake valve is a certain amount later than the top dead center, the closing timing of the exhaust valve is an equal amount earlier than the top dead center.

Due to this control, the amount of internal exhaust gas recirculation (hereinafter, referred to as "internal EGR") for re-combustion of a post-combustion gas can be stabilized. For example, if the exhaust valve is closed prior to the top dead center, the exhaust gas confined in the cylinder serves as an internal EGR. The amount of internal EGR substantially offsets the intake loss caused by the delay of the opening timing of the intake valve from the top dead center, so that the effect of internal EGR can be stably gained. If the exhaust valve is closed after the top dead center, the intake valve is opened prior to the top dead center. Therefore, exhaust gas reversely flows into the intake pipe and then is drawn back into the cylinder, so that the effect of internal EGR can be stably gained.

In any one of the above-described control apparatuses according to the first to third aspects of the invention, it is preferable that the intake valve of the internal combustion engine be opened after closure of the exhaust valve if the valve opening characteristic is in a minimum state. Such valve opening-closing timing means that the closure of the exhaust valve is not accompanied by a period during which both the exhaust valve and the intake valve are open (this period or state will hereinafter be referred to as "minus overlap"). It is not necessary to maintain a minus overlap in the case of a broadened state of the valve opening characteristic. If the minus overlap is applied, reduced emissions and improved fuel economy can be achieved by the above-described internal EGR.

In the invention, if the internal combustion engine has a plurality of cylinders, it is preferable that a minimum value of the valve opening characteristic be set within a range that is feasible for all the cylinders. Furthermore, it is preferable that a maximum value of the valve opening characteristic be set within a range that is feasible for all the cylinders. In general, if an internal combustion engine has a plurality of cylinders, the feasible valve opening characteristic often varies among the individual cylinders due to production errors and the like. Therefore, the setting of the valve opening characteristic within a range feasible for all the cylinders will further stabilize the output of the engine.

The above-described controls according to the first to third aspects of the invention may be suitably combined for application. The invention can be constructed not only in the form of a control apparatus of an internal combustion engine, but also in various other forms, such as a control method for an internal combustion engine, and the like.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Preferred embodiments of the invention will be described hereinafter with reference to the accompanying drawings.

A. Apparatus Construction

Figure 1:
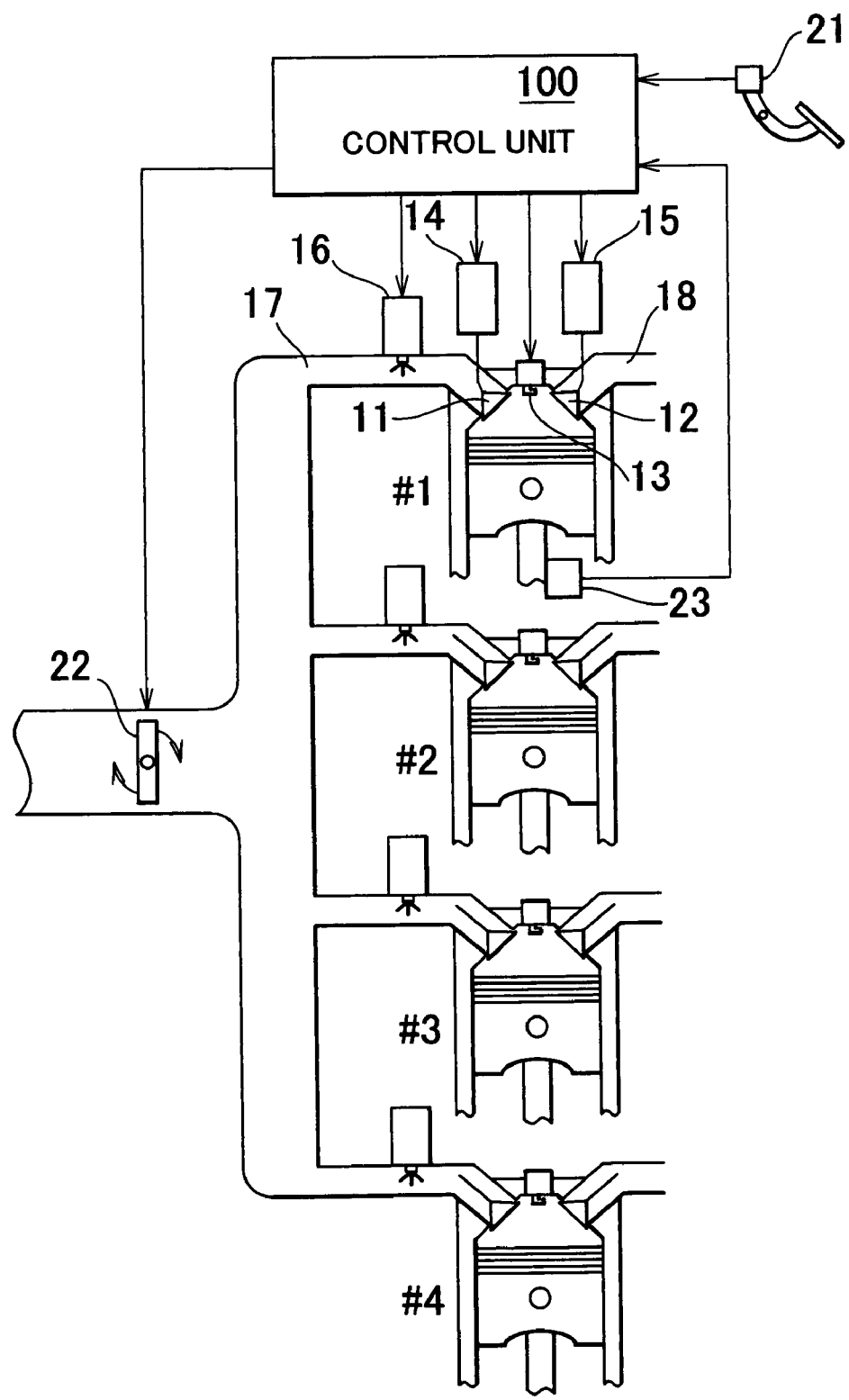
FIG. 1 is an illustration of an engine system as an embodiment of the invention.

FIG. 1 is an illustration of an engine system as an embodiment. The engine system of this embodiment includes a four-cylinder gasoline engine installed in a vehicle, and a control unit 100 for controlling the operation of the engine. In FIG. 1, the cylinders of the gasoline engine are represented by reference characters #1 to #4 for convenience of description.

The control unit 100 is formed as a microcomputer that has a CPU, a RAM and a ROM. The CPU controls the operation of the gasoline engine in accordance with programs stored in the ROM, thus performing a software-based control of the engine. The control unit 100 inputs and outputs various signals to execute the aforementioned control. FIG. 1 indicates only representative signals. The input signals include a signal indicating the amount of depression of an accelerator pedal detected by an accelerator operation sensor 21, a signal indicating the engine rotation speed detected by a rotation speed sensor 23, etc. Output signals will be described below in conjunction with the construction of the engine.

The structure of the engine will be described, with the cylinder #1 taken as an example. The engine outputs power by burning fuel in a combustion chamber. An intake pipe 17 for drawing air into the combustion chamber is provided with an intake valve 11. Air is introduced into the combustion chamber while the intake valve 11 is open. In the embodiment, the opening and closing of the intake valve 11 is controlled by an actuator 14, which is formed by e.g., an electromagnetically-driven valve, on the basis of a control signal from the control unit 100.

The intake pipe 17 is provided with an injector 16 for injecting fuel. In the embodiment, the engine is a port injection-type engine in which fuel is injected into the intake pipe 17. However, a so-called direct injection-type engine may also be adopted. The control unit 100 controls the injector 16 in accordance with the amount of intake air, and causes the injector 16 to inject an appropriate amount of fuel that allows normal combustion.

An ignition plug 13 is provided in the combustion chamber. A mixture of fuel and air is ignited by the ignition plug 13 after being compressed in the combustion chamber. The control unit 100 controls the ignition timing in accordance with the engine rotation speed, the requested load, etc.

Exhaust gas occurring after combustion is discharged via an exhaust pipe 18. The exhaust pipe 18 is provided with an exhaust valve 12. The opening and closing of the exhaust valve 12 is controlled by an actuator 15, which is formed by e.g., an electromagnetically-driven valve.

The structures of the cylinders #2 to #4 are substantially the same as the structure of the cylinder #1 although detailed illustration thereof is omitted to avoid a complicated drawing.

The power output from the engine changes depending on the amount of intake air introduced into the combustion chamber. In this embodiment, the amount of intake air is controlled in two fashions, that is, on two different bases. One of the bases for the control is the negative pressure in the intake pipe 17. Intake pipes of the cylinders #1 to #4 are connected at an upstream side to an intake manifold. A throttle valve 22 is provided in the intake manifold. As the control unit 100 controls the degree of opening of the throttle valve 22, the negative pressure in the intake pipe changes, and therefore the amount of intake air changes. For example, if the throttle valve 22 is substantially fully open, the pressure in the intake pipe becomes equal to the atmospheric pressure, and therefore allows relatively easy suction into the combustion chamber, so that the amount of intake air increases. If the opening of the throttle valve 22 is reduced, the pressure in the intake air becomes a negative pressure below the atmospheric pressure, so that the amount of air taken into the combustion chamber decreases.

Figure 2:
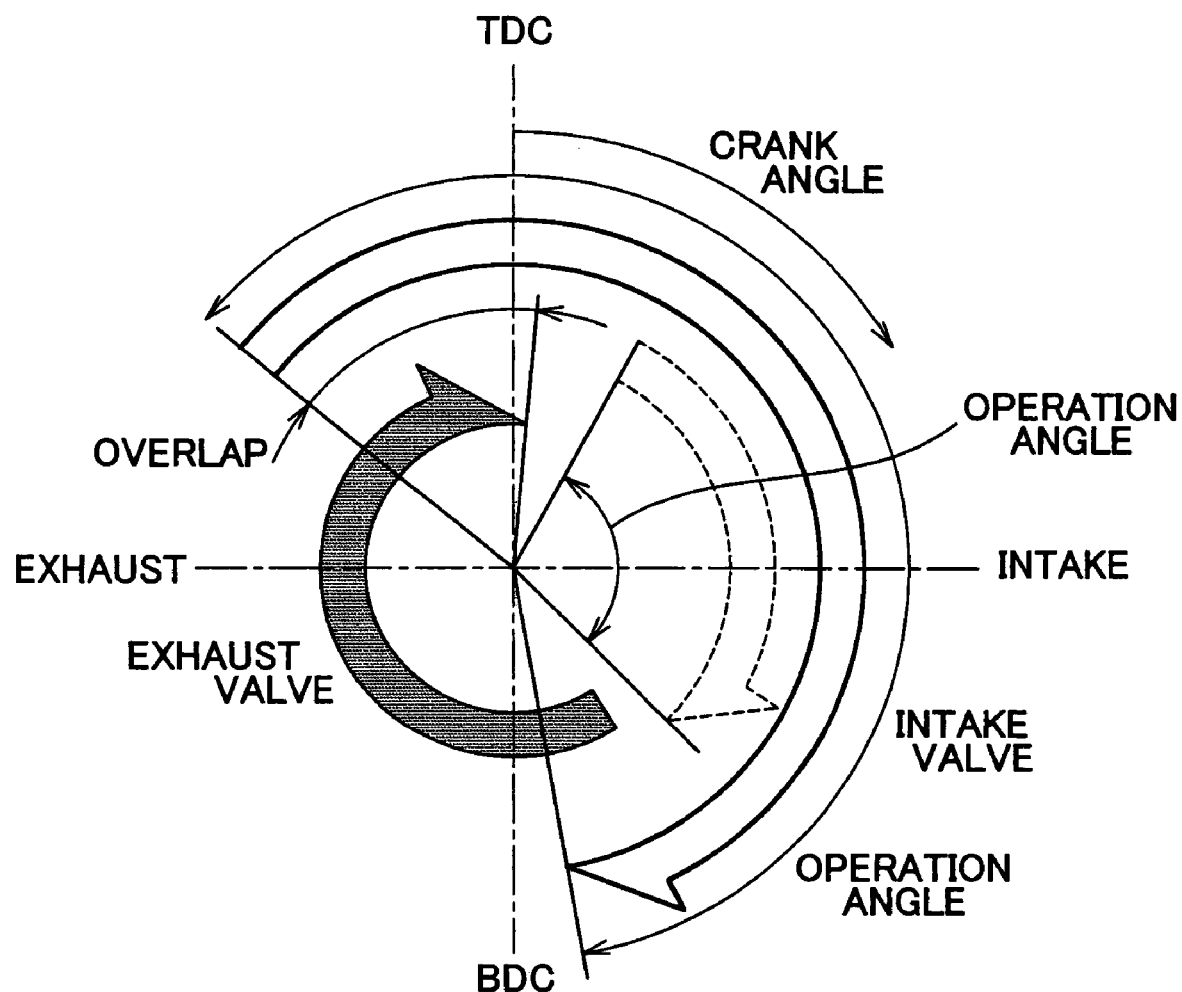
FIG. 2 is a diagram illustrating the action of an intake valve and an exhaust valve.

In this embodiment, the amount of intake air can be controlled on the basis of the period during which the intake valve 11 is open, and the lift of the intake valve 11, as well as the degree of opening of the throttle valve 22. FIG. 2 is a diagram illustrating the action of an intake valve and an exhaust valve. In FIG. 2, the open valve periods of the two valves are indicated in terms of the crank angle. The period indicated by the clockwise angle from the top dead center (TDC) of the piston to the bottom dead center (BDC) in FIG. 2 corresponds to the intake stroke. The period from the BDC to the TDC corresponds to the exhaust stroke. The period during which the exhaust valve is open is an angular range indicated by a solid arrow in FIG. 2. In the following description, the crank angle will be mentioned with a definition that the clockwise direction is a positive angle direction as indicated in FIG. 2.

The period during which the intake valve is open is an angular range indicated by blank arrows in FIG. 2. Hereinafter, this angular range will be referred to as "operation angle" of the intake valve. In this embodiment, the magnitude of the operation angle can be changed through control of the actuator 14, as indicated by a solid-line arrow and a broken-line arrow. The timing of starting to open the intake valve, that is, the phase thereof, can also be changed. If the operation angle is large, the effective intake stroke becomes long in effect, so that the amount of intake air increases. If the operation angle is small, the effective intake stroke becomes short, so that the amount of intake air decreases.

A characteristic of the control of the amount of intake air based on the degree of throttle opening is relatively low responsiveness. The reason for the low responsiveness is that if the intake pipe negative pressure is changed in the intake manifold, there is a slight delay time before the pressure change actually produces an effect on the amounts of air taken into the cylinders. In contrast, the control of the amount of intake air based on the operation angle has a characteristic of very high responsiveness. The amount of intake air can also be controlled on the basis of the amount of lift of the intake valve, as well as the operation angle. Although the embodiment will be described below in conjunction with a case where the control based on the operation angle is performed, it is also possible to control the amount of lift of the intake valve, instead of or in addition to the operation angle.

Although not illustrated in the drawings, the operation angle and the phase of the exhaust valve can be changed similarly to the case of the intake valve. The operation angle and the phase of the exhaust valve can be changed independently of the intake valve. However, in this embodiment, the operation angle and the phase of the exhaust valve are changed symmetrically to those of the intake valve in principle. The term "symmetrically" means that the open valve period of the intake valve and the open valve period of the exhaust valve are substantially symmetrical about a line passing through the TDC and the BDC in FIG. 2. For example, if the timing of opening the intake valve is "−θ (deg.)", that is, if the intake valve starts to open at a timing of θ (deg.) earlier than the TDC, the closing timing of the exhaust gas is θ (deg.) later than the TDC. This manner of control advantageously achieves a stable effect of internal EGR.

The period near or around the TDC during which both the intake valve and the exhaust valve are open is termed overlap period. The overlap period increases as the opening timing of the intake valve advances from the TDC. Conversely, if the opening timing of the intake valve is later than the TDC, no overlap occurs. In conjunction with the embodiment, the state where the intake valve opens after the exhaust valve closes will be referred to as minus overlap.

Figure 3:
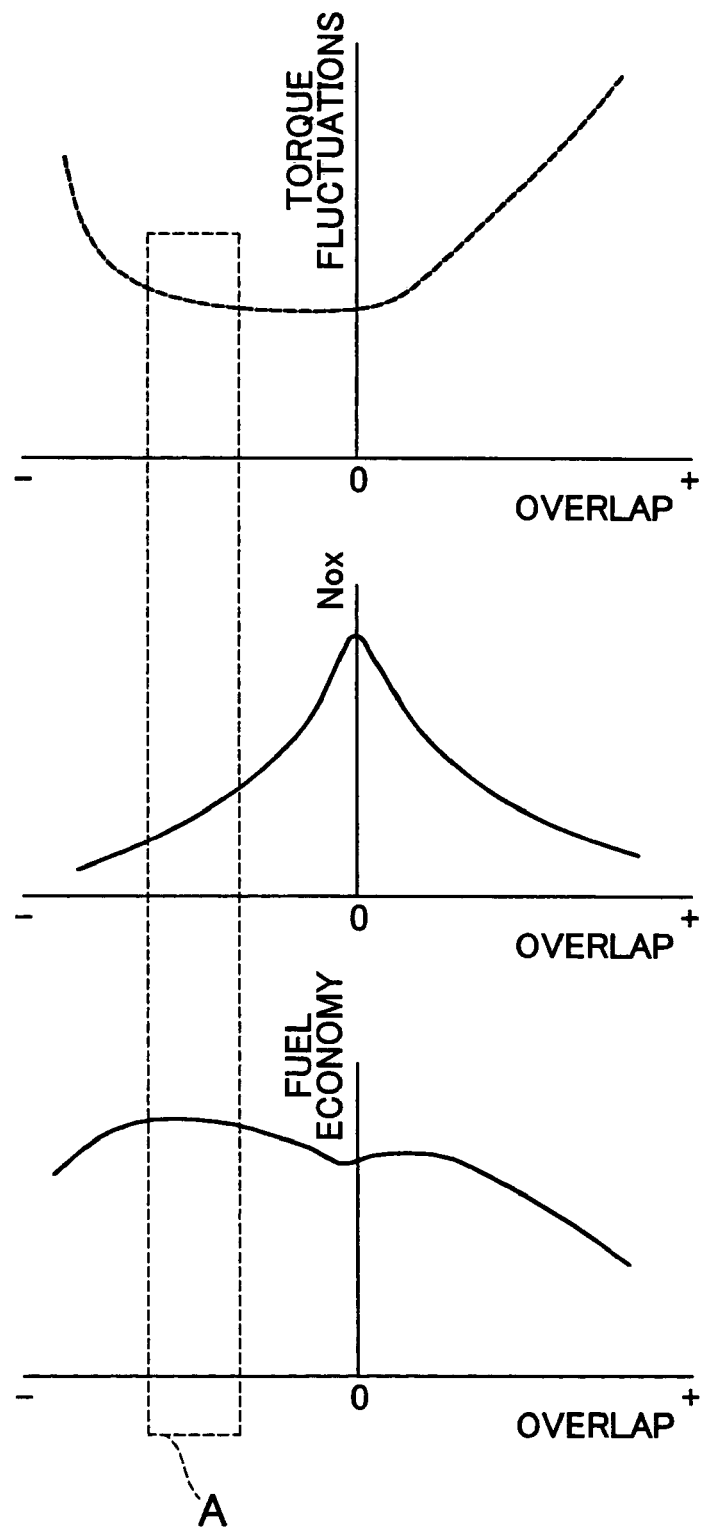
FIG. 3 is a diagram indicating effects caused by the valve overlap.

FIG. 3 is a diagram illustrating effects caused by the overlap. FIG. 3 indicates relationships of the amount of overlap with the torque shock, the emission of NOx, and the fuel economy. The torque shock, that is, the amount of variation of the actual output torque with respect to the target torque, is relatively favorable in a minus overlap region (e.g., a region A) as indicated in FIG. 3. The emission of NOx becomes more favorable toward a greater plus overlap side and a greater minus overlap side due to the generally-termed internal EGR effect. The fuel economy becomes relatively favorable in the minus overlap region. Thus, it can be understood that the minus overlap is useful in operation of the internal combustion engine.

Thus, the apparatus of the embodiment selectively uses the mode of controlling the amount of intake air on the basis of the degree of throttle opening (hereinafter, referred to as "throttle-based operation") and the mode of controlling the amount of intake air on the basis of the operation angle of the intake valve (hereinafter, referred to as "valve-based operation") in accordance with the load requested of the engine constructed as described above.

Figure 4:
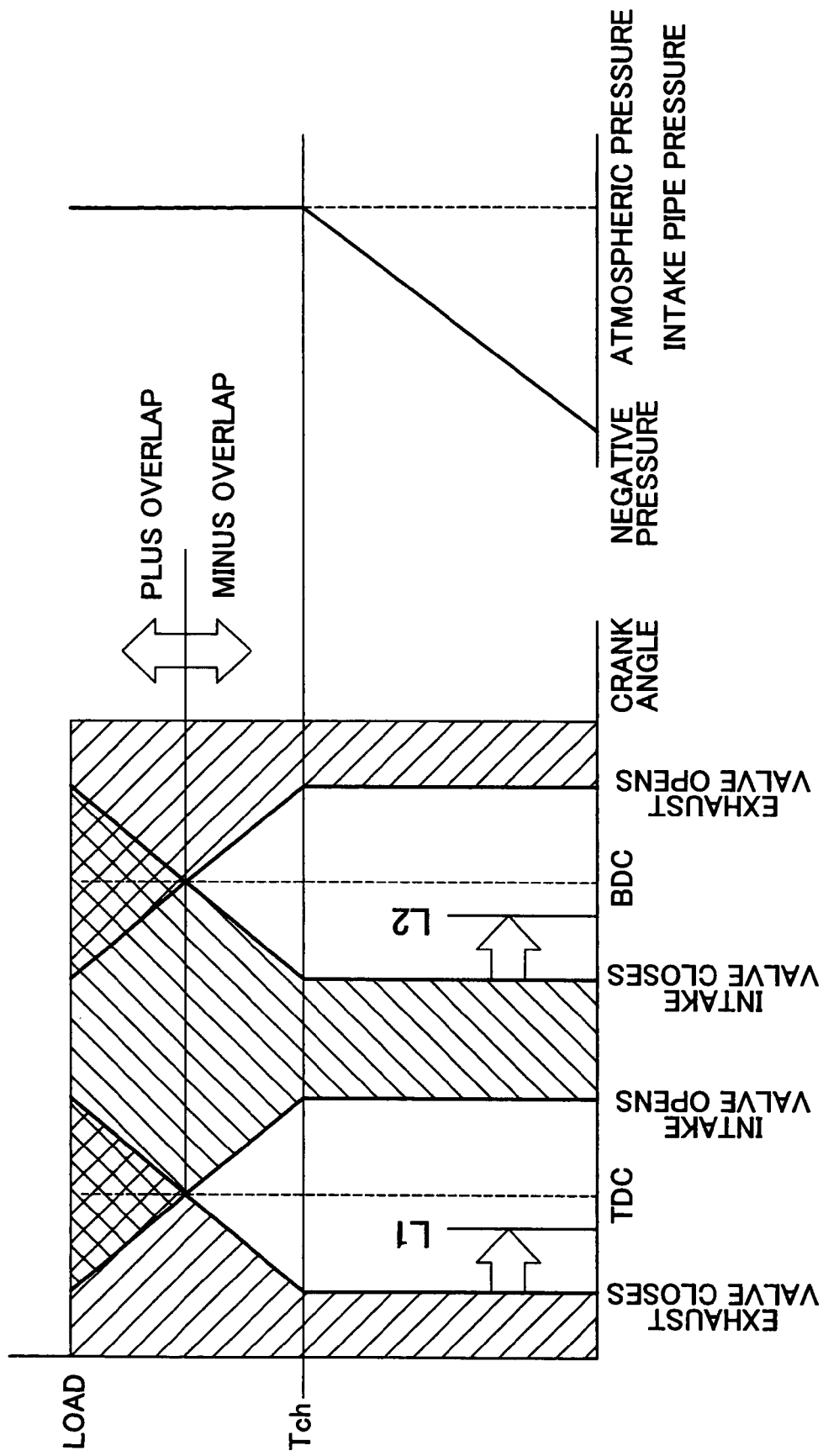
FIG. 4 is a diagram exemplifying a control switching-purposed map.

B. Intake Control Map:

The control unit 100 switches between the intake controls with reference to a map prepared beforehand. FIG. 4 is a diagram exemplifying a control switching-purposed map. In this embodiment, the map is designed so as to cause the switching of control in accordance with the engine load. It is also possible to prepare similar maps corresponding to engine rotation speeds so that the control switching may be performed in accordance with the engine rotation speed and the engine load.

A map for determining the operation angles of the intake valve and the exhaust valve in accordance with the load is indicated in a left side portion of FIG. 4. If the load is low, the exhaust valve is closed well before the TDC, and the intake valve is opened after the TDC. The closing timing of the exhaust valve and the opening timing of the intake valve are symmetrical about the TDC. During a low-load state, the operation angles of the intake valve and the exhaust valve are minimum. Therefore, the intake valve is closed well before the BDC, and the exhaust valve is opened after the BDC. In FIG. 4, periods during which both the intake valve and the exhaust valve are open are indicated by cross-hatching. When the load is low, there is no period during which both valves are open, that is, a minus overlap state occurs. It is preferable that the amount of minus overlap be set so as to improve fuel economy.

During the low-load state, the amount of intake air is controlled on the basis of the degree of throttle opening, instead of the valve operation angle. A diagram shown in a right side portion of FIG. 4 indicates changes in the intake pipe pressure in accordance with the load. As the load increases, the degree of throttle opening is increased, so that the pressure in the intake pipe rises from a negative pressure and approaches the atmospheric pressure. As a result, the amount of intake air increases, and the output of the internal combustion engine also increases.

If the load becomes equal to or greater than a predetermined threshold value Tch, the intake pipe pressure substantially reaches the atmospheric pressure, so that the amount of intake air cannot be controlled on the basis of the degree of throttle opening alone. In a region of high load above the threshold value Tch, the control is switched to the intake amount control based on the operation angle. In the high-load region, the operation angles of the intake valve and the exhaust valve expand with increasing load, as indicated in FIG. 4. Correspondingly, in many cases, the amount of overlap is changed from a minus value to a plus value in order to utilize intake-exhaust pulsation.

Although in the embodiment, the operation angle is set so as to linearly change in accordance with the load, the operation angle may be changed nonlinearly. Furthermore, although in the embodiment, the valve opening characteristics of the intake valve and the exhaust valve are set symmetrical about the TDC, the valve opening characteristics of the intake valve and the exhaust valve may be changed without such a constraint.

In this embodiment, a correction map for use in the case of degraded combustion during a low-load state is also set. If combustion degrades during a low-load state, the closing timing of the exhaust valve is shifted toward the TDC and the closing timing of the intake valve is shifted toward the BDC, as indicated by straight lines L1, L2 in FIG. 4. That is, both the closing timing of the intake valve and the closing timing of the exhaust valve are retarded. The opening timings of the intake and exhaust valves are fixed. The retardation of the closing timing of the exhaust valve achieves the effect of reducing the minus overlap, reducing the internal EGR amount, and therefore stabilizing the combustion. The retardation of the closing timing of the intake valve achieves the effect of enhancing the mixing of gas in the cylinder and therefore stabilizing the combustion. The maintenance of the late opening timing of the intake valve contributes to lowering the pressure in the cylinder, and therefore promotes atomization of fuel. Although in the embodiment, the correction performed in the case of degraded combustion is pre-set as indicated by the straight lines L1, L2, it is also possible to gradually change the valve closing timings in accordance with the condition of combustion.

Figure 5:
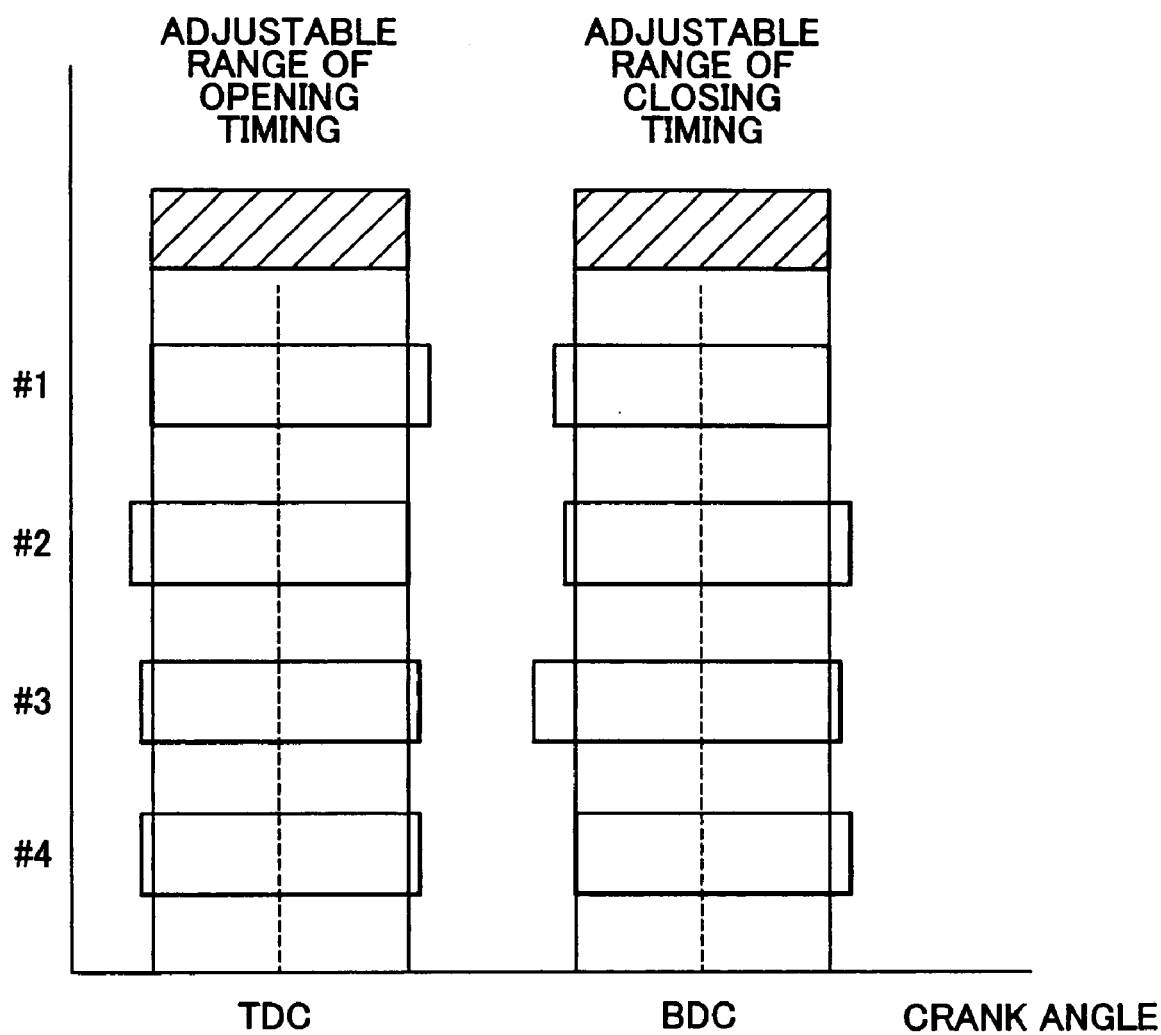
FIG. 5 is a diagram illustrating a method of setting the valve operation angle.

FIG. 5 is a diagram illustrating a method of setting the operation angle. In the diagram, an operation angle setting method for the intake valve is exemplified. In this embodiment, four cylinders #1 to #4 are provided as shown in FIG. 1. The intake valves of the cylinders have variations in the adjustable ranges of the opening timing and the closing timing due to production errors, and the like. In FIG. 5, the valve timing adjustable ranges of the individual cylinders are indicated by bands. In this embodiment, considering such variations in the valve timing adjustable ranges, an adjustable range of the valve opening timing and an adjustable range of the valve closing timing that are feasible for all the cylinders are set as indicated by hatched bands in an upper portion of the diagram of FIG. 5. By the same method, adjustable ranges are set for the exhaust valves as well. The map indicated in FIG. 4 is prescribed within the thus-set adjustable range. This manner of setting avoids the effect of variations in the operation angle among the cylinders.

In the region of high load above the threshold value Tch, the intake pipe pressure is kept at the atmospheric pressure as indicated in FIG. 4. The above-described control can also be accomplished by, for example, maintaining a fully open state of the throttle. In this embodiment, the degree of throttle opening is changed in the high-load region as well, in order to reduce the torque shock during the period of transition between the throttle-based operation and the valve-based operation.

Figure 6:
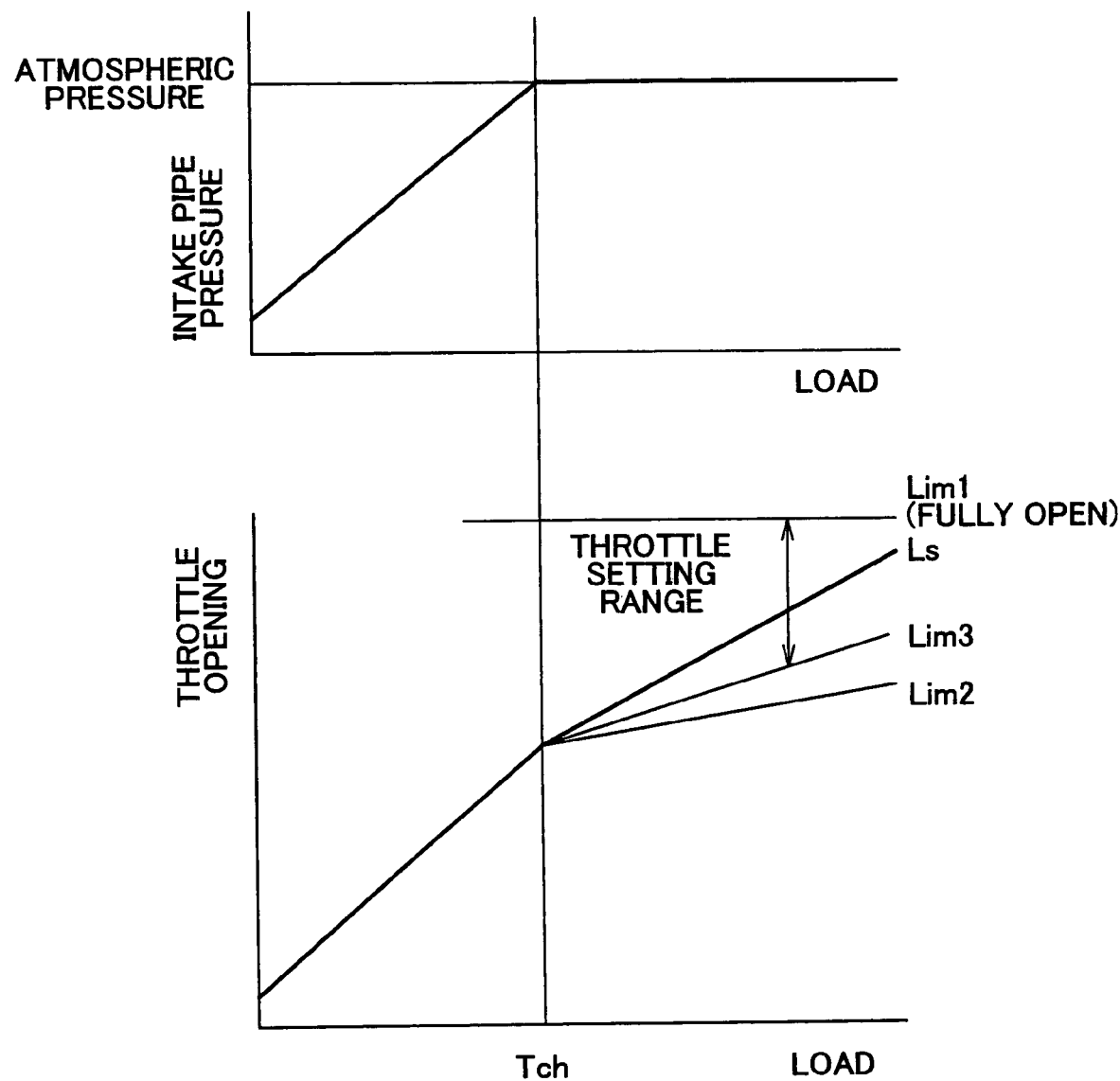
FIG. 6 is a diagram exemplifying a map for determining the degree of throttle opening.

FIG. 6 is a diagram exemplifying a map for determining the degree of throttle opening. An upper portion of FIG. 6 indicates changes in the intake pipe pressure relative to the load. A lower portion of FIG. 6 indicates the setting of the degree of throttle opening. The degree of throttle opening during the state of low load below the threshold value Tch is set as described above in conjunction with FIG. 4. That is, until the intake pipe pressure reaches the atmospheric pressure, the degree of throttle opening gradually increases as the load increases. At the time point the intake pipe pressure reaches the atmospheric pressure, the degree of throttle opening is not necessarily a full-open degree.

In the region of high load above the threshold value Tch, the degree of throttle opening is set, considering the following four conditions.

Condition 1 (straight line Lim1): The degree of throttle opening be less than or equal to the full-open degree.

Condition 2 (straight line Lim2): The degree of throttle opening be greater than or equal to the degree of opening that allows maintenance of the atmospheric pressure in the intake pipe at the time of a steady operation with the operation angles corresponding to various loads.

Condition 3 (straight line Lim3): The degree of throttle opening be greater than or equal to the degree of opening that allows maintenance of the atmospheric pressure in the intake pipe when the operation angle is changed in accordance with changes in the load.

Condition 4: The change in the degree of throttle opening be continuous between the throttle-based operation and the valve-based operation.

In general, as the intake valve operation angle increases, the amount of intake air increases, and therefore, the degree of throttle opening needed for keeping the intake pipe pressure at the atmospheric pressure increases. Therefore, the degree of throttle opening that satisfies Condition 2 increases with increasing load as indicated by the straight line Lim2. If the operation angle is changed, the degree of throttle opening needed for keeping the intake pipe pressure at the atmospheric pressure becomes greater than the degree of throttle opening needed for a steady state. Therefore, the straight line Lim3 corresponding to Condition 3 provides greater values than the straight line Lim2 corresponding to Condition 2. As for Condition 3, it would be appropriate to empirically or analytically set a degree of throttle opening that allows maintenance of the atmospheric pressure in the intake pipe during a state where the operation angle is changed at a practically required maximum rate of change.

In this embodiment, the degree of throttle opening is set (straight line Ls) so that Condition 4 is satisfied within a throttle setting region that satisfies Conditions 1 to 3. Although in the embodiment, the degree of throttle opening is set so as to linearly change in accordance with the load, the degree of throttle opening may be changed nonlinearly. It is also possible to provide a range where the throttle valve becomes fully open.

C. Engine Operation Control

Figure 7:
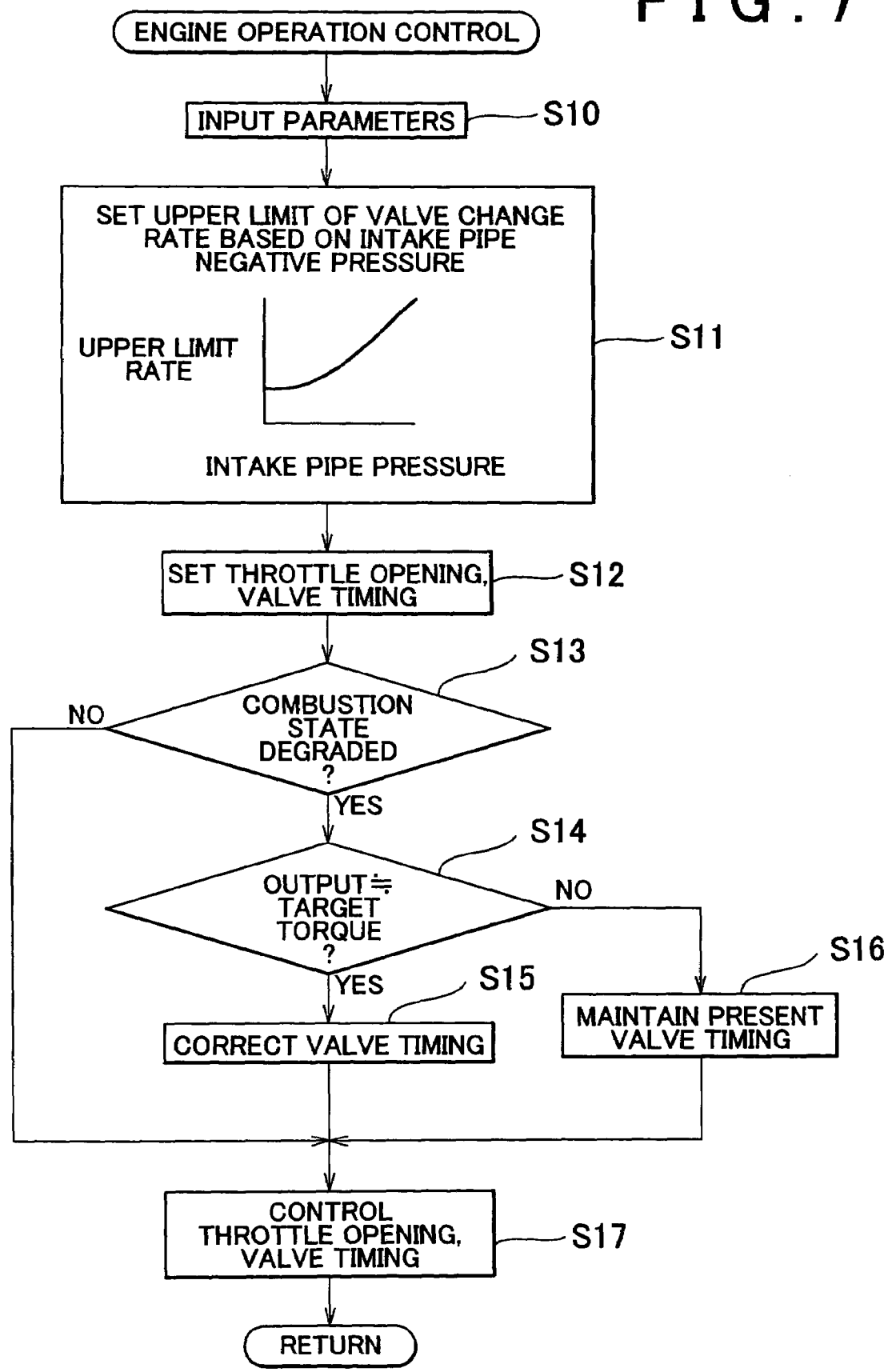
FIG. 7 is a flowchart illustrating an engine operation control process.

FIG. 7 is a flowchart illustrating an engine operation control process.

This control process is repeatedly executed by the control unit 100. In this process, the control unit 100 first inputs parameters needed for the control, such as the requested engine rotation speed, the requested engine load, the intake pipe negative pressure, etc. (step S10). The requested rotation speed may be an output value of the rotation speed sensor 23. The requested engine load may be set on the basis of the amount of accelerator operation.

Subsequently, the control unit 100 determines an upper limit value regarding the rates of changing the operation angle of the intake valve and the exhaust valve (hereinafter, referred to as "valve change rate") (step S11). In this embodiment, the setting of the upper limit value is performed through the use of a map that provides an upper limit value corresponding to the intake pipe pressure. This map is exemplified in FIG. 7. As indicated in FIG. 7, the valve change rate is curbed in a region of relatively low intake pipe pressure, and the valve change rate increases as the intake pipe pressure rises. This manner of setting makes it possible to keep the intake pipe pressure at the atmospheric pressure even while the operation angle is being changed, so that the amount of intake air can be stabilized.

The control unit 100 sets the degree of throttle opening and the valve timing in accordance with the maps illustrated in FIGS. 4 to 6 (step S12). If the state of combustion in each cylinder is not degraded (step S13), the control unit 100 controls the throttle, the intake valves and the exhaust valves so as to achieve the set degree of throttle opening and the set valve timing (step S17). Whether the combustion is degraded can be detected by, for example, the amount of an exhaust gas component, such as NOx or the like, the torque shock, the rotation speed change, etc.

If it is determined that the combustion is degraded (step S13), the control unit 100 determines whether the output of the engine is substantially equal to the target torque (step S14). This determination may be performed only during the throttle-based operation. If the target torque is substantially achieved, the valve timing is corrected in accordance with the correction map indicated in FIG. 4 (step S15). Specifically, the closing timings of the intake and exhaust valves are retarded so as to improve the combustion. If the target torque is not achieved, the values of the valve timing set in step S12 are not adopted but the previously-set values continue to be used, so that the current operation is continued (step S16). In general, the amount of intake air is measured by a flow sensor provided in the intake pipe. Therefore, if the valve timing is changed while the target torque is not achieved, that is, while the intake pipe pressure is changing, there is a possibility that the intake amount control will become unstable due to a degraded precision in flow measurement. After correction of the set value of the valve timing is performed as described above, the control unit 100 controls the degree of throttle opening and the valve timing (step S17).

According to the above-described control of the embodiment, the valve-based operation is performed while the intake pipe pressure is substantially kept at the atmospheric pressure. Therefore, the amount of intake air can be controlled with good precision, and the torque shock can be reduced or prevented. Furthermore, occurrence of a torque shock during the period of transition from the throttle-based operation to the valve-based operation can also be substantially prevented.

While the invention has been described with reference to what are presently considered to be preferred embodiments thereof, it is to be understood that the invention is not limited to the disclosed embodiments or constructions. On the contrary, the invention is intended to cover various modifications and equivalent arrangements within the spirit and scope of the invention. For example, the intake and exhaust valves do not need to be electromagnetic valves. The control may be realized in a hardware fashion as well as a software fashion.

What is claimed is:

1. A control apparatus for an internal combustion engine having a variable valve mechanism capable of changing a valve opening characteristic regarding an open state of an intake valve, and a throttle valve capable of changing a negative pressure in an intake pipe, the control apparatus comprising:

a controller capable of controlling the valve opening characteristic and a degree of opening of the throttle valve, the controller being adapted to control an amount of intake air taken into the internal combustion engine through at least one of the control of the valve opening characteristic and the control of the degree of opening of the throttle valve in accordance with an output that is requested of the internal combustion engine, wherein the controller is further adapted to, during a first operation state where the amount of intake air is controlled through the control of the valve opening characteristic control, control the degree of opening of the throttle valve within a range of the degree of opening of the throttle valve that allows maintenance of an atmospheric pressure in the intake pipe under a condition that the valve opening characteristic is in a steady state at least during the first operation state, while maintaining a continuity of the degree of opening of the throttle valve during a period of switch between the first operation state and a second operation state where the amount of intake air is controlled through the control of the degree of opening of the throttle valve only.

2. The control apparatus according to claim 1, wherein the controller is further adapted to maintain the range of degree of opening of the throttle valve that causes presence of the atmospheric pressure in the intake pipe during a transitional period during which the opening valve characteristic is changing.

3. The control apparatus according to claim 1, wherein the variable valve mechanism comprises an electromagnetically-drive valve.

4. A control apparatus for an internal combustion engine having a variable valve mechanism capable of changing a valve opening characteristic regarding an open state of an intake valve, and a throttle valve capable of changing a negative pressure in an intake pipe, the control apparatus comprising:

a controller capable of controlling the valve opening characteristic and a degree of opening of the throttle valve, the controller being adapted to control an amount of intake air taken into the internal combustion engine through at least one of the control of the valve opening characteristic and the control of the degree of opening of the throttle valve in accordance with an output that is requested of the internal combustion engine, wherein the controller is further adapted to, if a switch between an intake amount control through the control of the degree of opening of the throttle valve and an intake amount control through the control of the valve opening characteristic is requested, cause the requested switch after an output of the internal combustion engine based on a currently performed intake amount control has reached a steady state.

5. The control apparatus according to claim 4, wherein the requested switch is a switch from the intake amount control through the control of the degree of opening of the throttle valve to the intake amount control through the control of the valve opening characteristic.

6. The control apparatus according to claim 4, wherein the variable valve mechanism comprises an electromagnetically-drive valve.

7. A control apparatus for an internal combustion engine having a variable valve mechanism capable of changing a valve opening characteristic regarding an open state of an intake valve and an open state of an exhaust valve, the control apparatus comprising:

a controller capable of controlling the valve opening characteristic, which is adapted to control an amount of intake air taken into the internal combustion engine through the control of valve opening characteristic in accordance with an output that is requested of the internal combustion engine, wherein the controller is further adapted to control the valve opening characteristic so that an opening start timing of the intake valve and a closing timing of the exhaust valve become substantially symmetrical about a timing at which a combustion chamber capacity of the internal combustion engine becomes minimum at least during a predetermined operation state of the internal combustion engine.

8. The control apparatus according to claim 7, wherein the variable valve mechanism comprises an electromagnetically-drive valve.

9. The control apparatus according to claim 7, wherein the controller is further adapted to open the intake valve of the internal combustion engine after the exhaust valve has closed if the valve opening characteristic is in a minimum state.

10. The control apparatus according to claim 9, wherein the internal combustion engine has a plurality of cylinders equipped with the variable valve mechanism, and a minimum value of the valve opening characteristic to be controlled by the controller is set within a range that is feasible for all the cylinders.

11. A control method for an internal combustion engine having a variable valve mechanism capable of changing a valve opening characteristic regarding an open state of an intake valve, and a throttle valve capable of changing a negative pressure in an intake pipe, the control method comprising:

a valve control step of controlling the valve opening characteristic;

a throttle control step of controlling a degree of opening of the throttle valve; and an intake amount control step of controlling an amount of intake air taken into the internal combustion engine, by using at least one of the valve control step and the throttle control step in accordance with an output that is requested of the internal combustion engine, wherein in the throttle control step, the degree of opening of the throttle valve during a first operation state where the amount of intake air is controlled via the valve control step is controlled within a range of the degree of opening of the throttle valve that allows maintenance of an atmospheric pressure in the intake pipe under a condition that the valve opening characteristic is in a steady state at least during the first operation state, while a continuity of the degree of opening of the throttle valve is maintained during a period of switch between the first operation state and a second operation state where the amount of intake air is controlled by using the throttle control step without using the valve control step.

12. A control method for an internal combustion engine having a variable valve mechanism capable of changing a valve opening characteristic regarding an open state of an intake valve, and a throttle valve capable of changing a negative pressure in an intake pipe, the control method comprising:

a valve control step of controlling the valve opening characteristic;

a throttle control step of controlling a degree of opening of the throttle valve; and an intake amount control step of controlling an amount of intake air taken into the internal combustion engine, by using at least one of the valve control step and the throttle control step in accordance with an output that is requested of the internal combustion engine, wherein if a switch between an intake amount control using the throttle control step and an intake amount control using the valve control step is requested, the switch is performed in the intake amount control step after an output of the internal combustion engine based on a currently performed intake amount control has reached a substantially steady state.

13. A control method for an internal combustion engine having a variable valve mechanism capable of changing a valve opening characteristic regarding an open state of an intake valve and an open state of an exhaust valve, the control method comprising:

a valve control step of controlling the valve opening characteristic; and an intake amount control step of controlling an amount of intake air taken into the internal combustion engine, by using the valve control step in accordance with an output that is requested of the internal combustion engine, wherein in the valve control step, the valve opening characteristic is controlled so that an opening start timing of the intake valve and a closing timing of the exhaust valve become substantially symmetrical about a timing at which a combustion chamber capacity of the internal combustion engine becomes minimum at least during a predetermined operation state.

\* \* \* \* \*